Nov. 7, 1944.  W. G. SHIPMAN  2,361,971
CHAIN REPAIR TOOL
Filed March 4, 1942  3 Sheets-Sheet 1
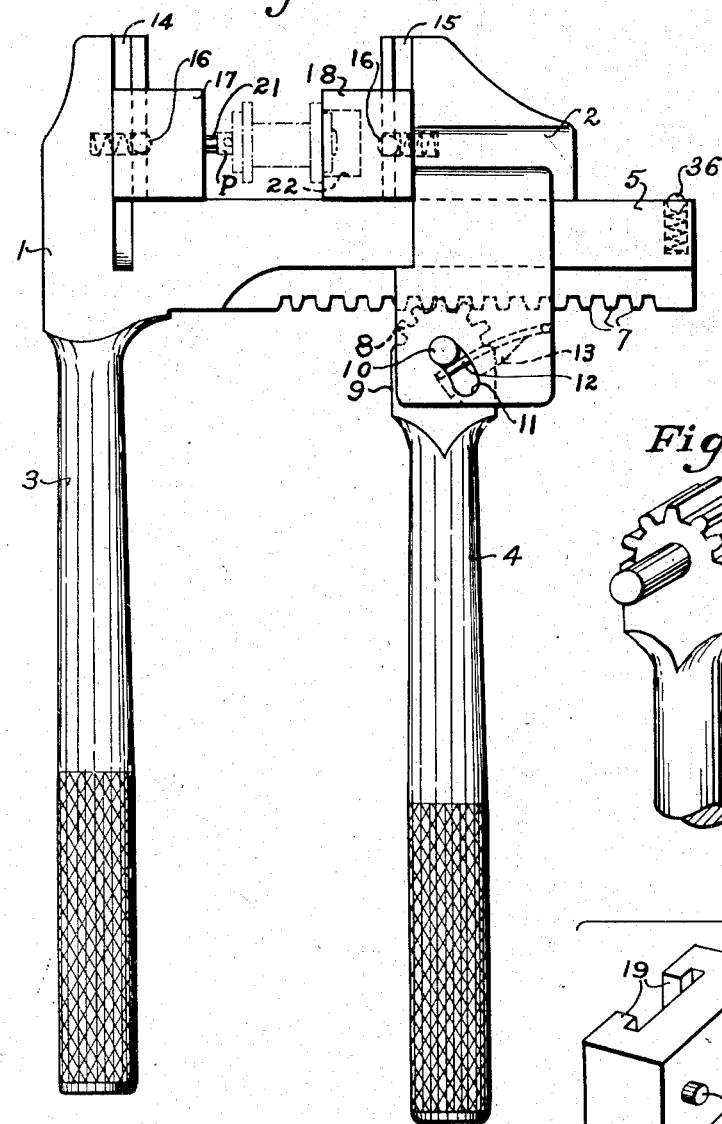
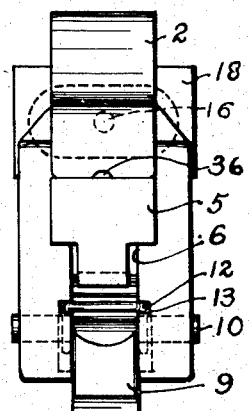
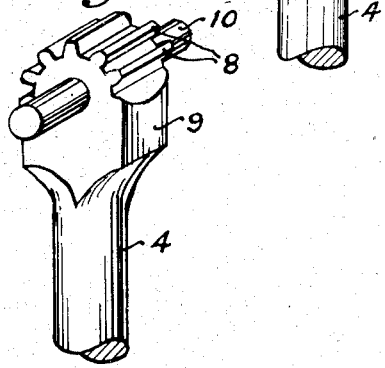
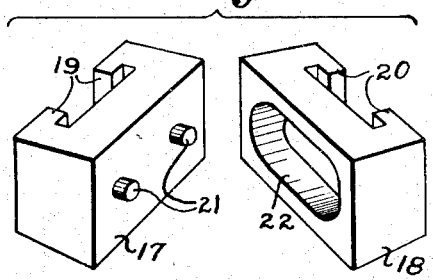
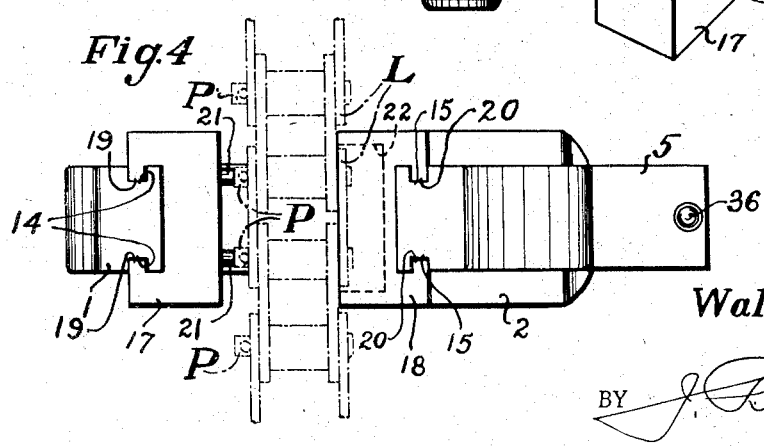
Walter G. Shipman
INVENTOR.
BY J. Preston Swecker
his ATTORNEY Nov. 7, 1944.  W. G. SHIPMAN  2,361,971
CHAIN REPAIR TOOL
Filed March 4, 1942  3 Sheets-Sheet 2
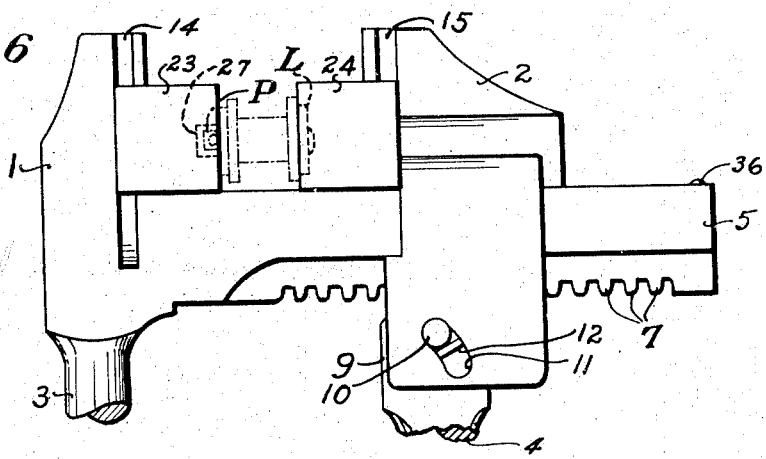
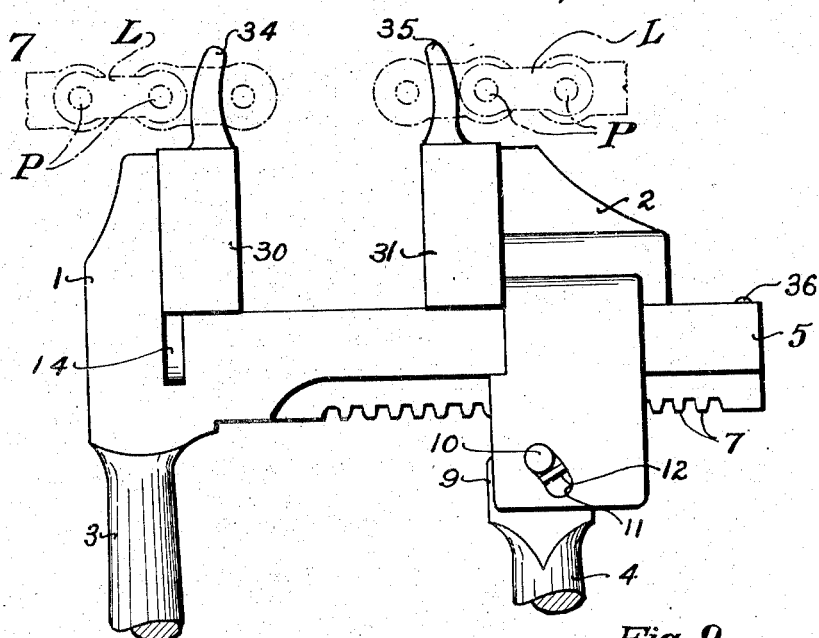
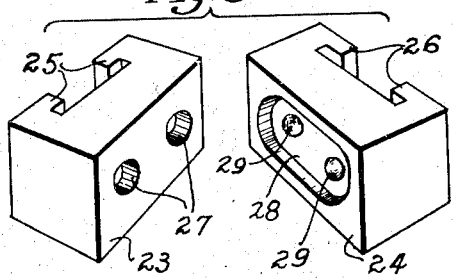
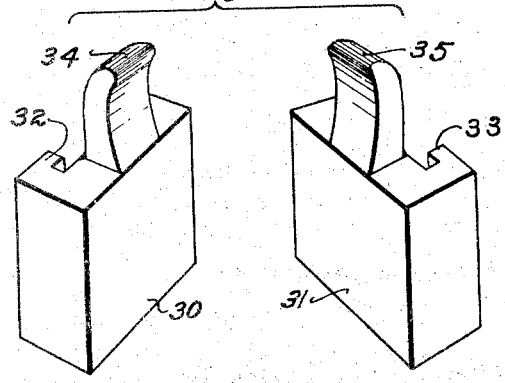
Walter G. Shipman
INVENTOR.
BY *J. Liston Swecker*
his ATTORNEY.

Nov. 7, 1944.  W. G. SHIPMAN  2,361,971
CHAIN REPAIR TOOL
Filed March 4, 1942    3 Sheets-Sheet 3
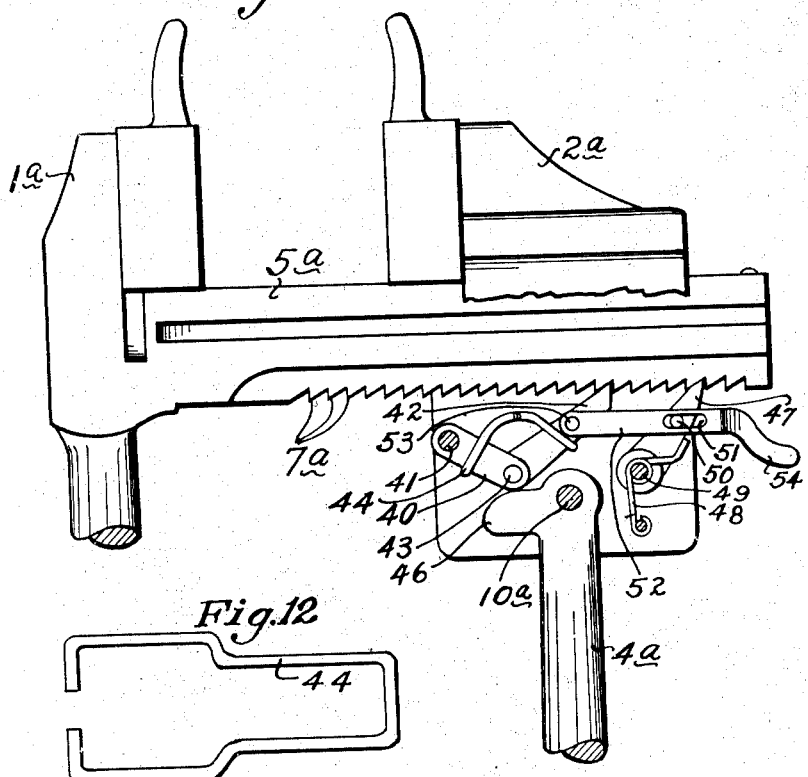
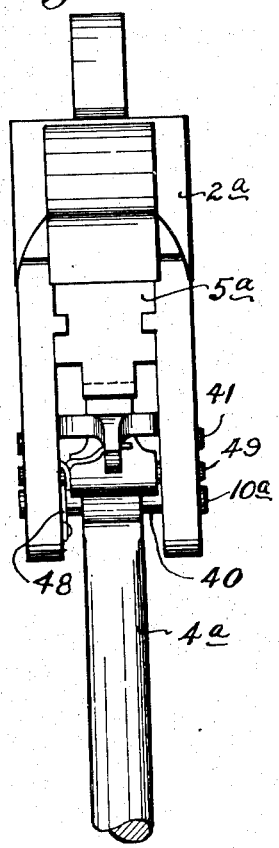
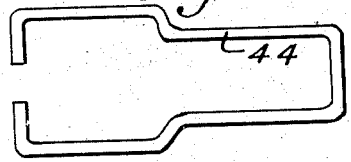
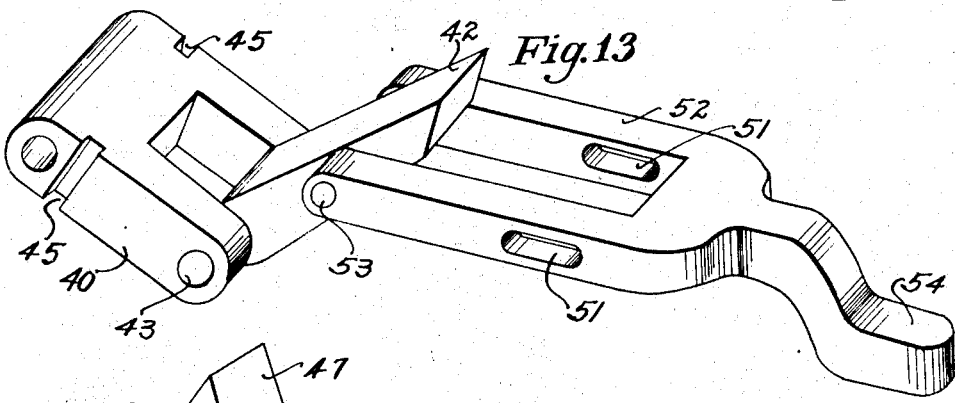
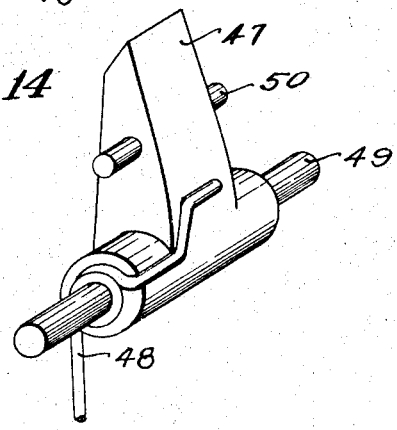
Walter G. Shipman
INVENTOR.
BY
his ATTORNEY.

Patented Nov. 7, 1944

2,361,971

UNITED STATES PATENT OFFICE 2,361,971

CHAIN REPAIR TOOL

Walter G. Shipman, Iowa Park, Tex.

Application March 4, 1942, Serial No. 433,401

17 Claims. (Cl. 59—7)

This invention relates to an improvement in chain repair tools, particularly for assembling, disassembling and tightening sprocket chains.

Sprocket chains of the character referred to usually comprise a series of pairs of links having rollers interposed between the links of each pair, through which pintle pins pass for joining together the series of links and forming the pivotal connections between the links of the chain.

Such sprocket chains are frequently used in heavy duty equipment, such as oil well rigging and the like, and often require repair in service. This repair requires the removal of the pintle pins for the replacement of any of the worn or broken parts of the chain. Since sprocket chains are connected in endless fashion, it is necessary to disconnect the chain for such repair, and after replacing the worn or broken parts, to reconnect the same by drawing together the ends into the proper relation and there securing the ends together by pintle pins.

Attempts have been made heretofore to provide tools for assembling, disassembling and connecting sprocket chains, but these tools have been bulky, cumbersome and ineffective, and not readily portable or usable in inaccessible places, as is required frequently.

The object of this invention is to improve the construction of chain repair tools, to provide a tool for doing all of the chain handling and repair operations, which tool is so constructed that it is readily usable in inaccessible places, being simple in construction and sufficiently light in weight that it is portable and movable from place to place by the operator, as may be desired.

In carrying out this object, I have provided a tool which is constructed with separable jaws capable of being moved together by pressure, and having detachable die blocks or heads removably mounted thereon, which may be inserted and removed readily for performing the necessary repair operations. When assembled, these die blocks may be moved together to connect or disconnect the chain links, insert or remove the pintle pins, or draw together the ends of the chain. One tool may be used for repairing chains of different sizes, by being provided with sets of die blocks adapted for the respective sizes of chains to be repaired, according to the different operations required, drawing the ends of the chains together, assembling or disassembling the same by inserting or removing the pintle pins.

I have shown a preferred embodiment of the invention, together with a modification thereof, in the accompanying drawings in which:

Fig. 1 is a side elevation of the chain repair tool with one set of die blocks in place therein;

Fig. 2 is a partial end elevation thereof with the handles broken away;

Fig. 3 is a detached perspective view of the operating portion of one of the handles;

Fig. 4 is a top plan view of the tool;

Fig. 5 is a disassembled perspective view of a pair of die blocks used for removing the pintle pins;

Fig. 6 is a side elevation of the jaw portion of the tool, showing a pair of die blocks used for assembling the sprocket chain;

Fig. 7 is a similar view showing still another set of die blocks for drawing the ends of the chain together;

Fig. 8 is a disassembled perspective view of the set of die blocks for drawing the ends of the chain together;

Fig. 9 is a similar view of the set of die blocks shown in Fig. 6;

Fig. 10 is a side elevation of the jaw portion of a modified form of tool with parts broken away and in section;

Fig. 11 is an end elevation thereof;

Fig. 12 is a top plan view of a pawl spring detached;

Fig. 13 is a perspective view of a toggle assembly detached; and

Fig. 14 is a perspective view of a holding pawl detached.

Referring to Figs. 1 to 4, the operative body of the tool comprises a pair of jaws 1 and 2 which are adapted to be manipulated by handles 3 and 4, respectively, the lower end portions of which handles are shown as knurled for ready grasping thereof by the operator. The jaw 1 is referred to as a fixed jaw, inasmuch as it is held in a rigid or stationary position, while the jaw 2 is movable toward and from the fixed jaw 1. A guide 5 extends laterally at right angles from the fixed jaw 1, preferably integral therewith, and slidably receives the jaw 2 thereon extending through a guideway 6 in said movable jaw.

The guide 5 is shown as substantially T-shape in cross section throughout the major portion of its length, so as to fit at its upper portion in the guide 6 while the lower edge thereof extends between a bifurcated lower portion of the jaw 2. The lower edge of the guide 5 is formed with rack teeth 7 thereon to intermesh with a gear segment 8 formed on the head 9 of the handle 4. The head 9 has a pivot pin 10 extending in opposite directions therefrom through arcuate slots 11 in opposite sides of the bifurcated lower portion of the jaw 2, to permit downward withdrawing movement of the gear segment 8 out of mesh with the rack teeth 7. The pivot pin 10 normally rests in the upper ends of the slots 11 in bearing relation therein, where it is held by the opposite ends of a U-shaped spring 12. The spring 12 embraces opposite sides of the head 9, and is seated in grooves 13 formed in the inner sides of the bifurcated portion of the jaw 2, the lower ends of which grooves are widened to permit freedom of flexing movement of the spring ends, so as to accommodate downward sliding movement of the pivot pin 10 in the slots 11.

The inner portions of the respective jaws 1 and 2 are provided with dove-tail guides 14 and 15, respectively, each formed by grooves in the opposite faces of the jaws. The guides 14 and 15 are adapted to receive thereon replaceable die blocks slidable relative to the guides to seated positions in proper relation to the jaws 1 and 2. Each of the die blocks is provided with a recess or seat in its outer face in position to be engaged by a spring-pressed ball or pin 16 in the inner face of the corresponding jaw, so as to hold the block in its desired operative position, but free to be withdrawn therefrom when desired.

One set of die blocks is shown in Figs. 1, 4 and 5, designated 17 and 18, having dove-tail slides 19 and 20 thereon adapted to interfit respectively with the guides 14 and 15. The block 17 has a pair of plungers 21 fixed thereon in positions corresponding substantially with the predetermined spacing of a pair of pintle pins for the chain. The block 18 has a recess 22 therein of an area slightly greater than a link of the chain for slidably interfitting with the link. The depth of the recess is appreciably greater than the thickness of the link to allow for movement of the link and pintle pins into the recess during the disconnecting movement thereof. The pair of die blocks 17 and 18 are of the form used for disconnecting this sprocket chain, removing the pintle pins and links therefrom.

The tool should be provided with additional pairs of die blocks for other operations, such as the insertion of the pintle pins, as shown in Figs. 6 and 9 and the drawing together of the ends of the chain, as shown in Figs. 7 and 8.

The assembling die blocks are designated 23 and 24, having slides 25 and 26 on the outer faces thereof for interfitting with the guides 14 and 15 on the jaws 1 and 2. The inner face of the block 23 has a pair of recesses 27 therein arranged to correspond substantially with the predetermined spacing of the pintel pins of the chain. The block 24 has a recess 28 therein corresponding substantially in area with the face of a side plate of the chain, and of a depth approximately equal the width of the link. Depressions 29 may be formed in the bottom of the recess 28 to receive the projecting ends of the pintle pins which protrude slightly from the face of the side plate.

The connecting die blocks for the ends of the chain, as shown in Figs. 7 and 8, are designated 30 and 31, having slides 32 and 33 thereon for detachably engaging with the guides 14 and 15, respectively. The die blocks 30 and 31 have upstanding arms 34 and 35, respectively, adapted to engage end links of the chain for drawing together said links upon manipulation of the tool.

In the operation of the tool for disassembling the chain by uncoupling the links thereof, the die blocks 17 and 18 are inserted on the guides 14 and 15 in the relation shown in Figs. 1 and 4, the blocks being held in their proper aligned positions by the spring-pressed balls or pins 16. These are arranged so that the plungers 21 will be in perfect alignment with the pintle pins of the chain when the opposite side plate thereof is received in the recess 22. In the drawings, I have designated the side plates of the chain at L and the pintle pins thereof at P, which pins normally pass through rollers interposed between the side plates and are secured by cotters in the outer ends thereof. The gear segment 8 may be withdrawn out of mesh with the rack 7 by pulling downward on the handle 4 against the tension of the spring 12, to permit the jaw 2 to be moved inward on the guide 5 sufficiently to position the chain substantially in the relation shown in Figs. 1 and 4, with a side plate L in the recess 22. With the parts thus positioned, the handle 4 may be released and the gear segment 8 will move into engagement with the rack under pressure of the spring 12. Then upon moving the handle 4 to the left in Fig. 1, the jaw 2 will be pressed toward the jaw 1 sufficiently for the plungers 21 to press the pintle pins P through the side plates at the left in Figs. 1 and 4, the side plate L in the recess 22 sliding back in said recess to accommodate this movement.

After thus releasing the pins, the chain may be released by swinging the handle 4 to the right or pulling it downward to disengage the segment 8 from the rack, and sliding back the jaw 2 to release the chain. The pins P then may be removed manually from the connected chain links and the chain thus taken apart. The outward movement of the jaw 2 on the guide 5 is limited by a resilient stop 36, preferably in the form of a spring-pressed ball which will prevent the jaw from slipping off the guide except when subjected to excessive pressure toward the end thereof, and yet will permit disconnection when desired.

For reassembling the chain, the blocks 30 and 31 are placed on the jaws 1 and 2 slipping over the guides 14 and 15 thereon, as shown in Fig. 7. The arms 34 and 35 are engaged in end links of the chain, and by action of the gear segment 8, the jaws 1 and 2 are moved together in the manner described above until the holes in the chain link are brought sufficiently close together that the pintle pins may be inserted therein for securing the ends of the chain. These blocks 30 and 31 are then removed, and replaced by the blocks 23 and 24. The plate of the thus inserted pintle pins is fitted into the shallow recess 28 of the block 24 with the pintle pin in alignment with the openings 27 in the block 23. Then by manipulating the handles 3 and 4 in the manner described, the pintle pins are pressed through the plates of the chain into the holes 27, and the chain links thus secured together. Upon insertion of cotters in the pintle pins, these are secured in place.

A modified form of the tool is shown in Figs. 10 to 14 designed to exert a much more powerful stroke or action than is desired and better adapted for larger chains. This tool is constructed with jaws 1a and 2a adapted to receive die blocks substantially of the character described above and shown in Figs. 1 to 9. The jaw 1a has a laterally extending guide 5a slidably receiving the jaw 2a thereon, and provided with a ratchet toothed rack 7a at the lower edge thereof.

For manipulating the jaws, I have provided a toggle device comprising a link 40 pivoted in the bifurcation of the jaw 2a at 41. A click pawl 42 is pivoted at 43 to the free end of the toggle link 40, and said click pawl 42 is arranged in position to engage the ratchet teeth 7a, as shown in Fig. 10. The pawl 42 is held normally in engagement with the ratchet teeth by a loop spring 44 embracing the pawl 42 and with sides thereof engaging in grooves 45 in opposite edges of the link 40 to hold the spring 44 substantially in the bowed position shown in Fig. 10, thus exerting pressure on the pawl 42 tending to keep it in engagement with the ratchet teeth 7a. The toggle device is manipulated by a handle 4a pivoted at 10a to the jaw 2a, and having an off-set nose 46 projecting from one side thereof in position to bear against the joint of the toggle adjacent the pivot 43 to press the same upward against the tension of the bowed spring 44.

A holding pawl is shown at 47 in engagement with the ratchet teeth 7a under the influence of a spring 48, the pawl being pivoted to the jaw 2a at 49. The holding pawl 47 has a laterally projecting pin 50 slidably received in slots 51 in opposite sides of a U-shaped link 52 having one end pivoted at 53 to the pawl 42, while the opposite end is provided with a handle 54 thereon for manipulation thereof.

By pressing the handle 4a toward the handle of the jaw 1a, the straightening action of the toggle 40—42 causes the jaws 1a, 2a, to be moved toward each other, which action may be repeated successively upon stepping movements of the pawl 42, and the corresponding holding movement of the pawl 47, until the jaws have been moved into the proper operative relation according to the action desired in repairing the chain. It will be evident that upon release of the handle 4a, the bowed spring 44 will tend to return the toggle device substantially to the position shown in Fig. 10, and thus move the pawl 42 into engagement with the next ratchet tooth 7a, while the parts are held against slippage by the pawl 47. After the operation is completed, according to the set of die blocks used on the jaws, the jaws may be separated readily by release of one or both of the pawls, which is accomplished by depressing the handle 54 on the link 52 with a downward or outward movement, thus permitting the jaw 2a to be moved outward on the guide 5a and release of the chain therebetween.

It will be evident that the foregoing constructions provide for the necessary disassembling, assembling, or tightening of sprocket chains, by means of one tool that is light and portable, and yet sufficiently powerful, to accomplish the actions necessary for the purpose. This tool may be used for chains of different sizes merely by the provision of sets of die blocks corresponding with the respective chains, making it unnecessary to provide a separate tool for each size of chain and operation thereon, as has been required heretofore. The simplicity and portable character of the tool makes it very useful in any desired position even in inaccessible places, as often required.

I claim:

1. A chain repair tool comprising a pair of jaws, means for connecting said jaws together for movement toward and from each other, a pair of die blocks for the respective jaws constructed to receive a chain portion therebetween and for action thereon, one of said die blocks having a recess therein of a size and shape substantially to receive a chain link therein and the other die block having means thereon in position to register with a chain pintle pin.

2. A chain repair tool comprising a pair of jaws, means for connecting said jaws together for movement toward and from each other, a pair of die blocks for the respective jaws constructed to receive a chain portion therebetween and for action thereon, one of said die blocks having a recess therein of a shape substantially to receive a chain link therein, and the other of said die blocks having a plunger thereon in position to engage a pintle pin to disengage the latter from the chain upon movement of the jaws toward each other.

3. A chain repair tool comprising a pair of coacting jaws having opposed inner faces, handles connected with the respective jaws, means actuated by at least one of the handles for relatively moving said jaws, a pair of die blocks bearing respectively against the opposed inner faces of the jaws, means for detachably connecting the respective die blocks with the jaws, one of said die blocks having an opening in the inner face thereof of an area sufficient to receive therein a link of a sprocket chain disposed between said die blocks, and the other die block having means at the inner face thereof in position for alignment with the spaced pintle pins of the sprocket chain link received in said opening.

4. A chain repair tool comprising a pair of coacting die blocks for receiving therebetween a portion of a sprocket chain, means for causing movement of said die blocks toward and from each other, one of said die blocks having an opening in the inner face thereof of an area sufficient to receive therein a link of the sprocket chain, and the other die block having means at the inner face thereof in position for alignment simultaneously with the spaced pintle pins of the sprocket chain link received in said opening and coacting therewith for movement of the pins relative to adjacent chain portions.

5. A chain repair tool comprising a pair of jaws, one of said jaws having a handle rigidly fixed thereto and having a laterally projecting guide, the other jaw being slidably mounted on said guide for movement toward and from the first-mentioned jaw, said guide having teeth along an edge thereof, a handle having a pivotal connection with the second-mentioned jaw and movable bodily relative thereto, and gearing means operatively connecting the pivoted handle with the teeth for movement of the second-mentioned jaw toward the first-mentioned jaw.

6. A chain repair tool comprising a pair of jaws, one of said jaws having a handle rigidly connected therewith and having a laterally extending guide fixed thereto and slidably receiving the other jaw thereon for movement toward and from the first-mentioned jaw, said guide having teeth thereon along an edge thereof, a handle having a pivotal connection with the second-mentioned jaw and movable bodily relative thereto, and a gear member fixed to said pivoted handle in position to mesh with the teeth on the guide for moving the second-mentioned jaw along the guide.

7. A chain repair tool comprising a pair of jaws, one of said jaws having a handle connected therewith and having a laterally extending guide connected therewith and slidably receiving the other jaw thereon for movement toward and from the first-mentioned jaw, said guide having teeth thereon along an edge thereof, a handle having a pivotal connection with the second-mentioned jaw and movable bodily relatively thereto, and gearing means connected with the handle for engaging the teeth in one position of the handle and cause movement of the second-mention jaw.

8. A chain repair tool comprising a pair of jaws, one of said jaws having a handle connected therewith and having a laterally extending guide connected therewith and slidably receiving the other jaw thereon for movement toward and from the first-mentioned jaw, said guide having teeth thereon along an edge thereof, the second-mentioned jaw having a slot therein, a handle having a pivot pin mounted in said slot forming a slidable and pivotal connection of said handle with said jaw, and gearing means connected with the handle for engaging the teeth in one position of the handle and cause movement of said second-mentioned jaw.

9. A chain repair tool comprising a pair of jaws, one of said jaws having a handle connected therewith and having a laterally extending guide connected therewith and slidably receiving the other jaw thereon for movement toward and from the first-mentioned jaw, said guide having teeth thereon along an edge thereof, the second-mentioned jaw having a slot therein, a handle having a pivot pin mounted in said slot forming a slidable and pivotal connection of said handle with said jaw, gearing means connected with the handle for engaging the teeth in one position of the handle and cause movement of said second-mentioned jaw, and a leaf-spring having one portion fixed to the second-mentioned jaw and another portion bearing against said pivot pin tending to move the gearing means into engagement with the teeth.

10. A chain repair tool comprising a pair of jaws, one of said jaws having a handle rigidly connected therewith and having a laterally extending guide fixed thereto and slidably receiving the other jaw thereon for movement toward and from the first-mentioned jaw, said guide having teeth thereon along an edge thereof, a handle pivotally connected with the second-mentioned jaw, a pawl pivotally supported on the movable jaw, and means connected with the pivoted handle for actuating said pawl to engage the teeth on the guide.

11. A chain repair tool comprising a pair of jaws, one of said jaws having a handle rigidly connected therewith and having a laterally extending guide fixed thereto and slidably receiving the other jaw thereon for movement toward and from the first-mentioned jaw, said guide having teeth thereon along an edge thereof, a handle pivotally connected with the second-mentioned jaw, a toggle device pivotally supported on the movable jaw and having a pawl in position to engage the teeth on the guide, and means connected with the pivoted handle for actuating the toggle device and pawl for relative movement between the movable jaw and guide lengthwise thereof.

12. A chain repair tool comprising a pair of jaws, one of said jaws having a handle rigidly connected therewith and having a laterally extending guide fixed thereto and slidably receiving the other jaw thereon for movement toward and from the first-mentioned jaw, said guide having teeth thereon along an edge thereof, a handle pivotally connected with the second-mentioned jaw, a toggle device pivotally supported on the movable jaw and having a pawl in position to engage the teeth on the guide, means connected with the pivoted handle for actuating the toggle device and pawl for relative movement between the movable jaw and guide lengthwise thereof, a holding pawl connected with the movable jaw for engagement with the teeth, and means connected with said pawls for disengaging the same from the teeth.

13. A chain repair tool comprising a pair of jaws, one of said jaws having a handle connected therewith and having a laterally extending guide connected therewith and slidably receiving the other jaw thereon for movement toward and from the first-mentioned jaw, said guide having teeth thereon along an edge thereof, a handle pivotally connected with the second-mentioned jaw, a toggle device pivotally supported on the movable jaw and having means for operatively engaging the teeth to move said jaw along the guide, and means connected with the pivoted handle for actuating the toggle device.

14. A chain repair tool comprising a pair of jaws, one of said jaws having a handle connected therewith and having a laterally extending guide connected therewith and slidably receiving the other jaw thereon for movement toward and from the first-mentioned jaw, said guide having teeth thereon along an edge thereof, a handle pivotally connected with the second-mentioned jaw, a toggle device pivotally supported on the movable jaw and including a link and pawl pivotally connected together with said pawl in position to engage the teeth, and a cam connected with the pivoted handle for actuating the toggle device to move said jaw along the guide.

15. A chain repair tool comprising a pair of jaws, one of said jaws having a handle connected therewith and having a laterally extending guide connected therewith and slidably receiving the other jaw thereon for movement toward and from the first-mentioned jaw, said guide having teeth thereon along an edge thereof, a handle pivotally connected with the second-mentioned jaw, a toggle device pivotally supported on the movable jaw and including a link and pawl pivotally connected together with said pawl in position to engage the teeth, a cam connected with the pivoted handle for actuating the toggle device to move said jaw along the guide, and resilient means connecting the link and pawl together for stepping action of the pawl upon release of the toggle device by the cam.

16. A chain repair tool comprising a pair of jaws, one of said jaws having a handle connected therewith and having a laterally extending guide connected therewith and slidably receiving the other jaw thereon for movement toward and from the first-mentioned jaw, said guide having teeth thereon along an edge thereof, a handle pivotally connected with the second-mentioned jaw, a toggle device pivotally supported on the movable jaw and including a link and pawl pivotally connected together with said pawl in position to engage the teeth, a cam connected with the pivoted handle for actuating the toggle device to move said jaw along the guide, resilient means connecting the link and pawl together for stepping action of the pawl upon release of the toggle device by the cam, a holding pawl pivotally supported on the movable jaw in position to engage the teeth, and means pivotally connected with said pawls for selective disengagement thereof.

17. A chain repair tool comprising a pair of jaws, one of said jaws having a handle connected therewith and having a laterally extending guide connected therewith and slidably receiving the other jaw thereon for movement toward and from the first-mentioned jaw, said guide having teeth thereon along an edge thereof, gearing means having interengagement with said teeth and mounted on said second-mentioned jaw for movement into and out of engagement with said teeth, and a handle connected with said gearing means for operating the same when in engagement with the teeth to move the jaws relatively toward each other.

WALTER G. SHIPMAN.